PAY TELEVISION EMPLOYING INTERFERING SOUND SIGNAL

Original Filed July 16, 1956

5 Sheets-Sheet 1

Fig. I.

Inventor:
Thomas A. Banning, Jr.

PAY TELEVISION EMPLOYING INTERFERING SOUND SIGNAL

Original Filed July 16, 1956 5 Sheets-Sheet 2

Inventor:

Thomas A. Banning, Jr.

Tho. A. Banning, Jr.

PAY TELEVISION EMPLOYING INTERFERING SOUND SIGNAL

Original Filed July 16, 1956 5 Sheets-Sheet 3

Inventor:
Thomas A. Banning, Jr.

PAY TELEVISION EMPLOYING INTERFERING SOUND SIGNAL

Original Filed July 16, 1956 5 Sheets-Sheet 4

Inventor:
Thomas A. Banning, Jr.

PAY TELEVISION EMPLOYING INTERFERING SOUND SIGNAL

Original Filed July 16, 1956 5 Sheets-Sheet 5

Inventor:
Thomas A. Banning, Jr.
Thos. A. Banning Jr.

3,336,439
PAY TELEVISION EMPLOYING INTERFERING SOUND SIGNAL

Thomas A. Banning, Jr., Apt. 1408, 5500–5520 S. Shore Drive, Chicago, Ill. 60615

Application Dec. 17, 1962, Ser. No. 245,277, now Patent No. 3,222,452, dated Dec. 7, 1965, which is a division of application Ser. No. 597,950, July 16, 1956, now Patent No. 3,070,652, dated Dec. 25, 1962. Divided and this application July 16, 1963, Ser. No. 295,484
5 Claims. (Cl. 178—5.6)

Figure 1:
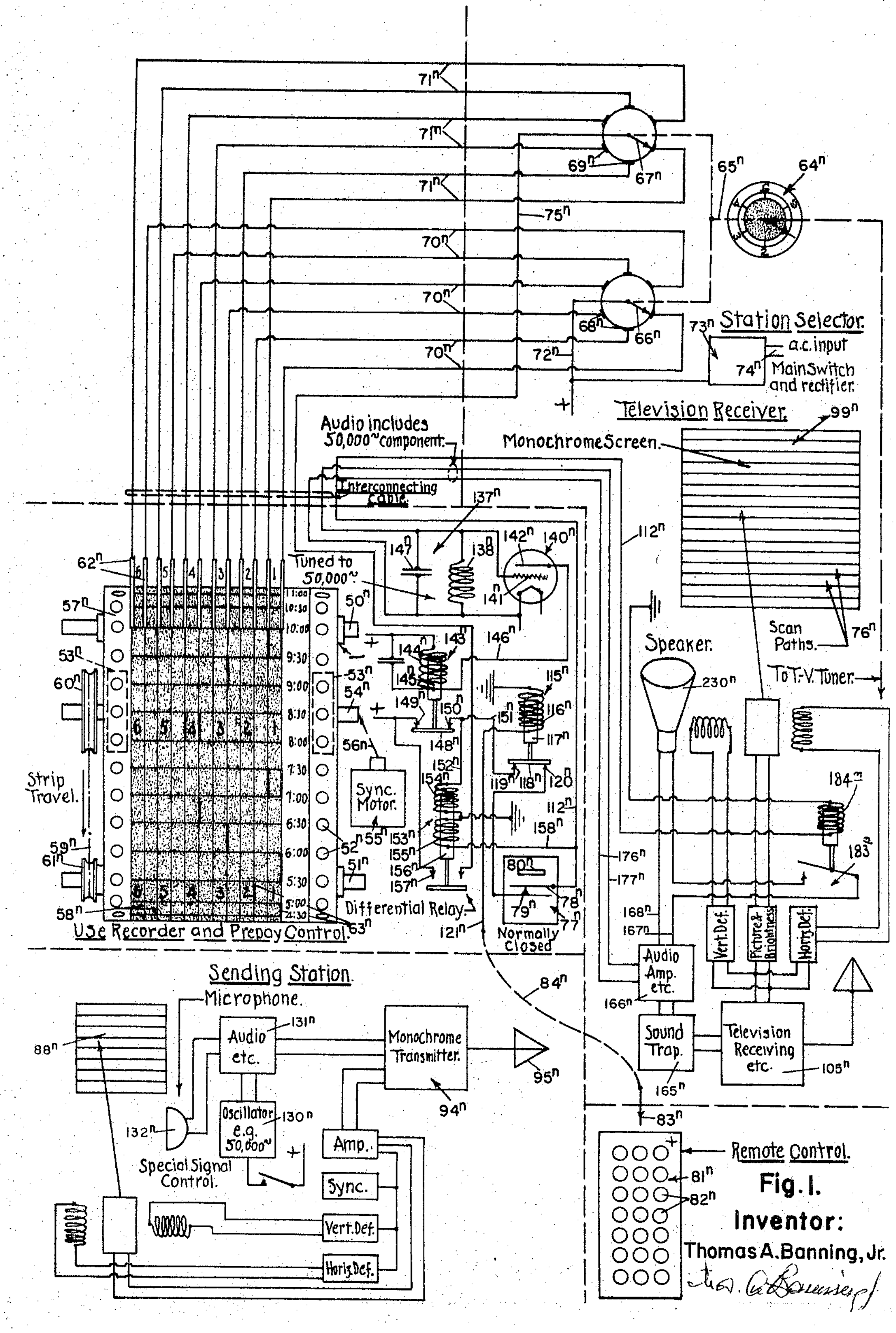

This application is a division of my co-pending application for Letters Patent of the United States, Ser. No. 245,277, filed Dec. 17, 1962 (now Patent No. 3,222,452) as a division of my earlier application, Serial No. 597,950, filed July 16, 1956, and issued as Letters Patent No. 3,070,652 on December 25, 1962, each of such applications being titled Improvements in Radio and Television Program Selecting, and Time of Use Recording. Said application, Ser. No. 597,950 was co-pending with my earlier application, Ser. No. 235,854, filed July 9, 1951, and issued as Letters Patent No. 2,755,334, on July 17, 1956.

This invention relates to improvements in radio and television operation, and the like. More particularly, the improvements hereinafter illustrated and described concern themselves with television and audio reception, and the means to produce such reception, whereby certain programs being emitted from the sending station may be received by conventional operations of translation of the received signals under conditions which will produce both picture translation and audio translation of the picture and audio components of the program as fully intelligible translations under acceptable excellence; or under conditions which will produce one of the above two defined components as a fully intelligible translation and acceptable excellence, but will either fail to produce the other of such defined components, so that only the one component is intelligibly translated, or will produce the translation of the other of such defined components under non-acceptable conditions of translation.

Conveniently, the embodiments hereinafter disclosed are such that the picture component is translated as a fully intelligible and acceptable translation, but the audio component is either blanked out or rendered un-acceptable as a translation. As an example of such un-acceptable translation of the audio component I may mention the introduction into the audio component, of a signal of audio frequency, conveniently of constant frequency, such as a 500 c.p.s. hum signal, rendering the reception of the program highly distasteful to the observer.

Specifically, the improvements hereinafter disclosed include means to enable reception of the program emitted by the sending station either under the condition that both the picture component and the audio component are translated as acceptable translations of high quality when the program is of what may be termed "ordinary" quality, without the need of pre-pay or other special payment or credit operation; but under the condition that the audio component of the program is either blanked out or made otherwise un-acceptable (as by injection of such a "hum" signal, into the audio reception), when the program is of what may be termed "special" quality; with further provision for restoring the audio component into the translation, or eliminating the "hum" signal from the audio reception, either when pre-pay is made, or other special payment or credit operation is produced by or for the person observing the reception of the program. Thus provision is made for either of two picture translations, one with the acceptable audio translation, and without pre-pay or other special payment operation, and the other without any audio reception, or, alternatively, with an unacceptable audio reception; and further, with provision for restoring the audio reception or removing the objectionable noise element, such as the hum, by making prepay or bringing into operation the special payment or credit operation previously referred to.

Certain of the features of invention hereinafter disclosed are also applicable to emission and reception of audio programs alone, and not as part of a television program. In such cases the "ordinary" audio program may be received as an acceptable translation without pre-pay or special payment operation; but when a "special" quality radio program is being emitted, the translation thereof will either be blanked out or rendered un-acceptable by an interfering noise injection, such as the "hum" signal previously referred to, unless and until the pre-pay or other special payment operation is made or used.

In connection with the foregoing objectives, it is a further object to make provision for producing a recording of the times when any of such "special" programs are tuned by the observer's receiver, whether such programs comprise television programs with audio reception, according to conventional practice, or comprise only the audio programs without television or picture translations. Such recording will enable proper distribution of payments thus pre-paid, or credit operations to be distributed among numerous sponsors of the "special" programs, thus also simplifying auditing and related operations based on the reception of various "special" programs, having different sponsors.

Other objects and uses of the invention will appear from a detailed description of the same, which consists in the features of construction and combinations of parts hereinafter described and claimed.

Figure 2:
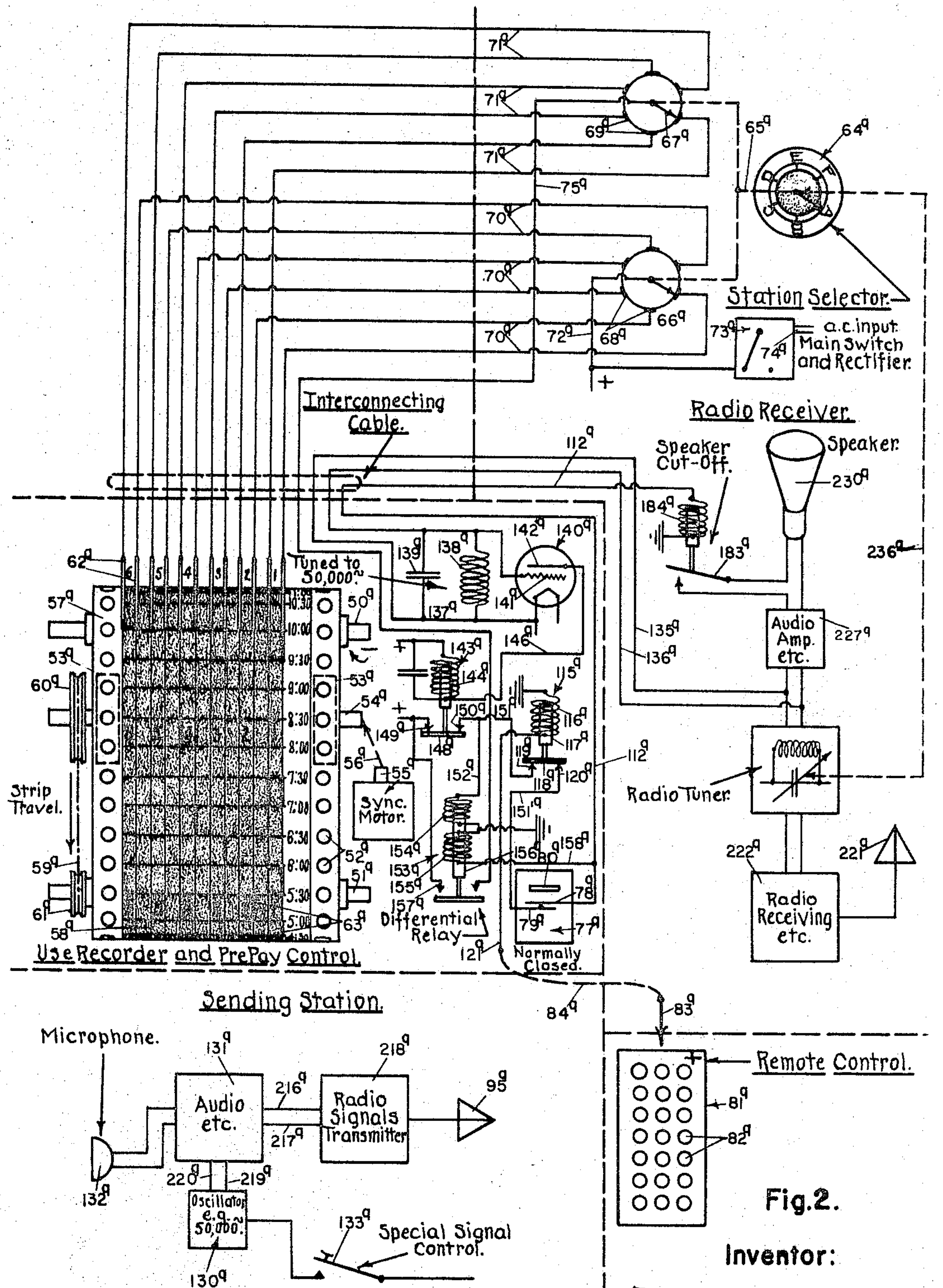
Figure 3:
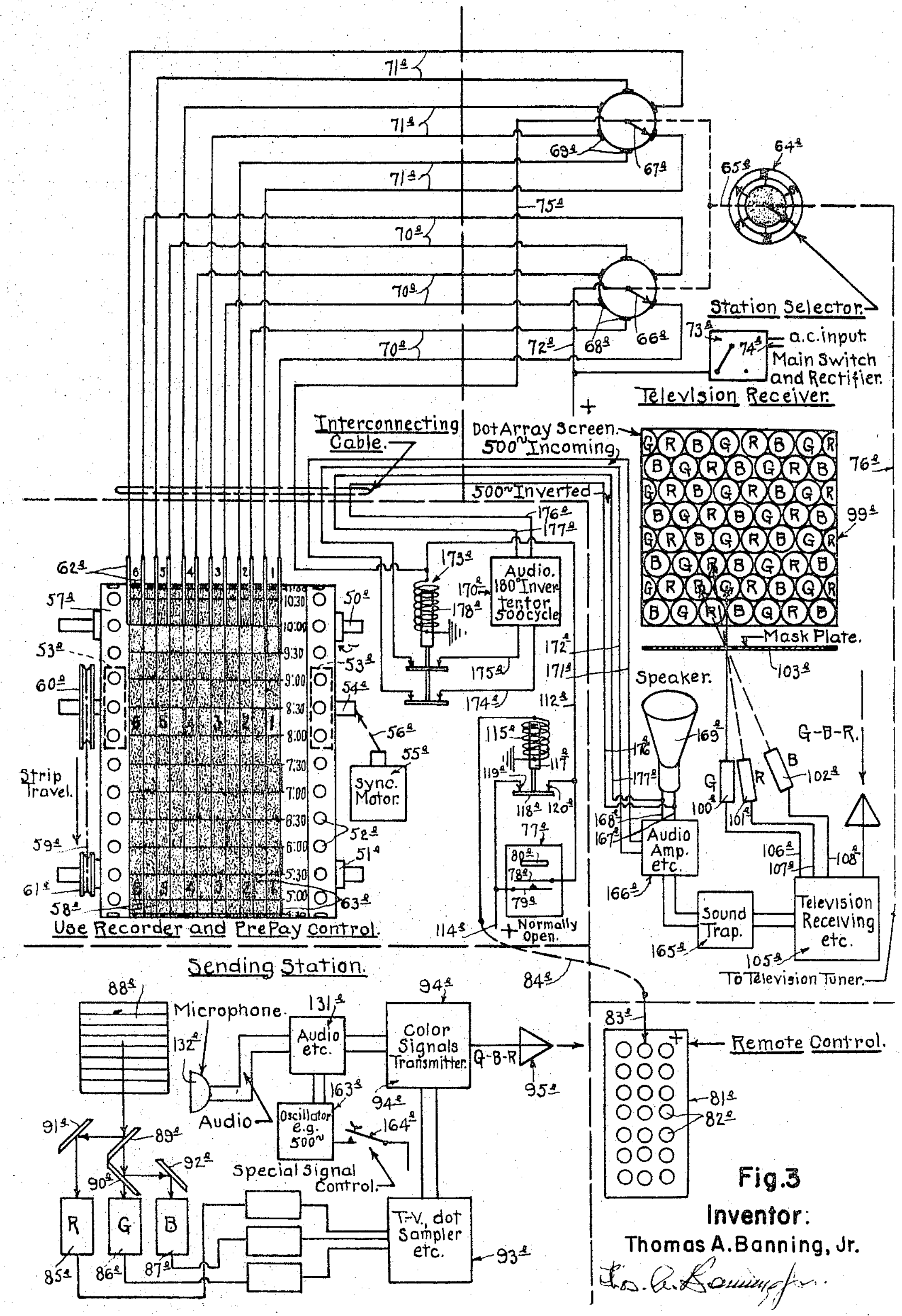
Figure 4:
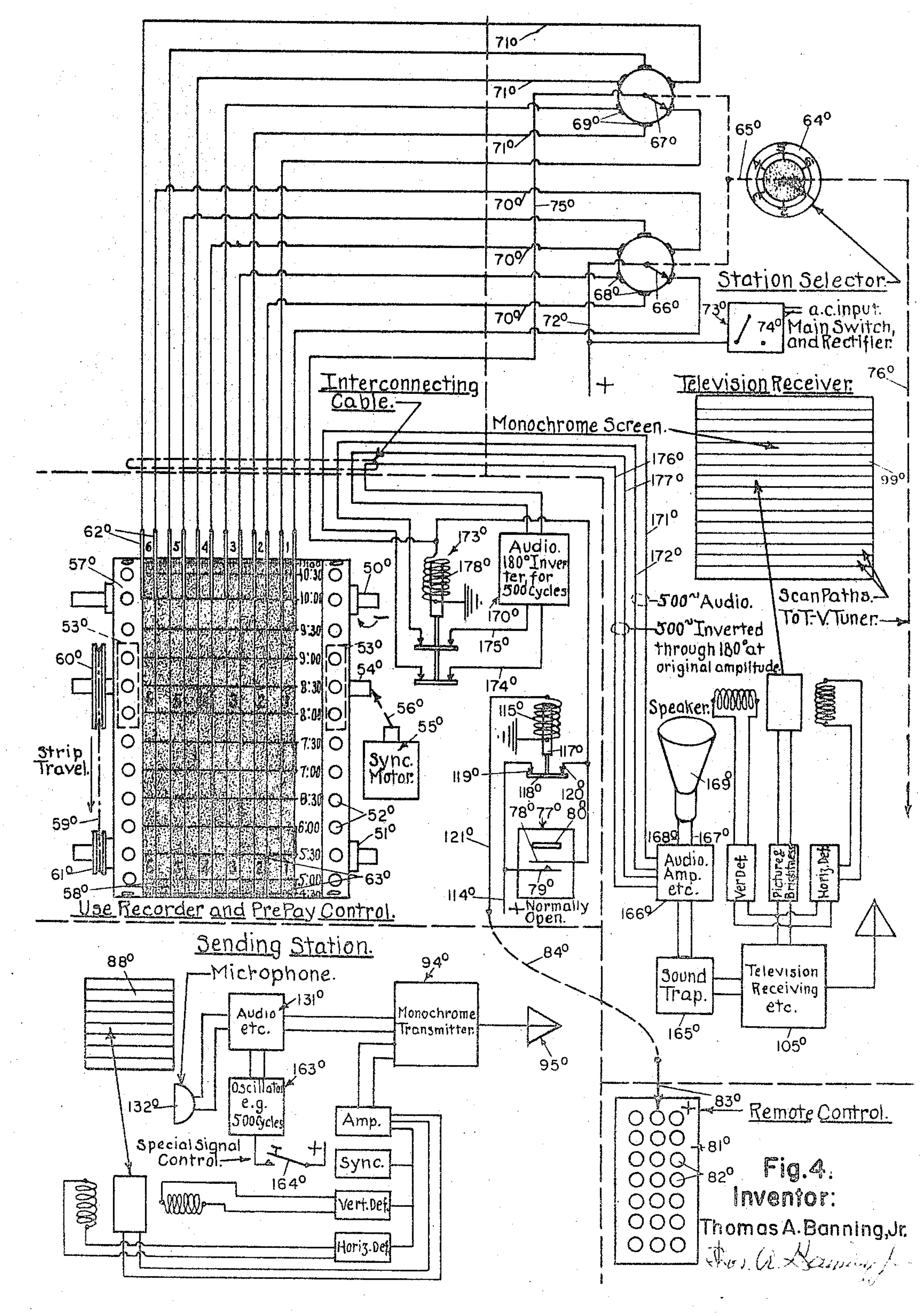
Figure 5:
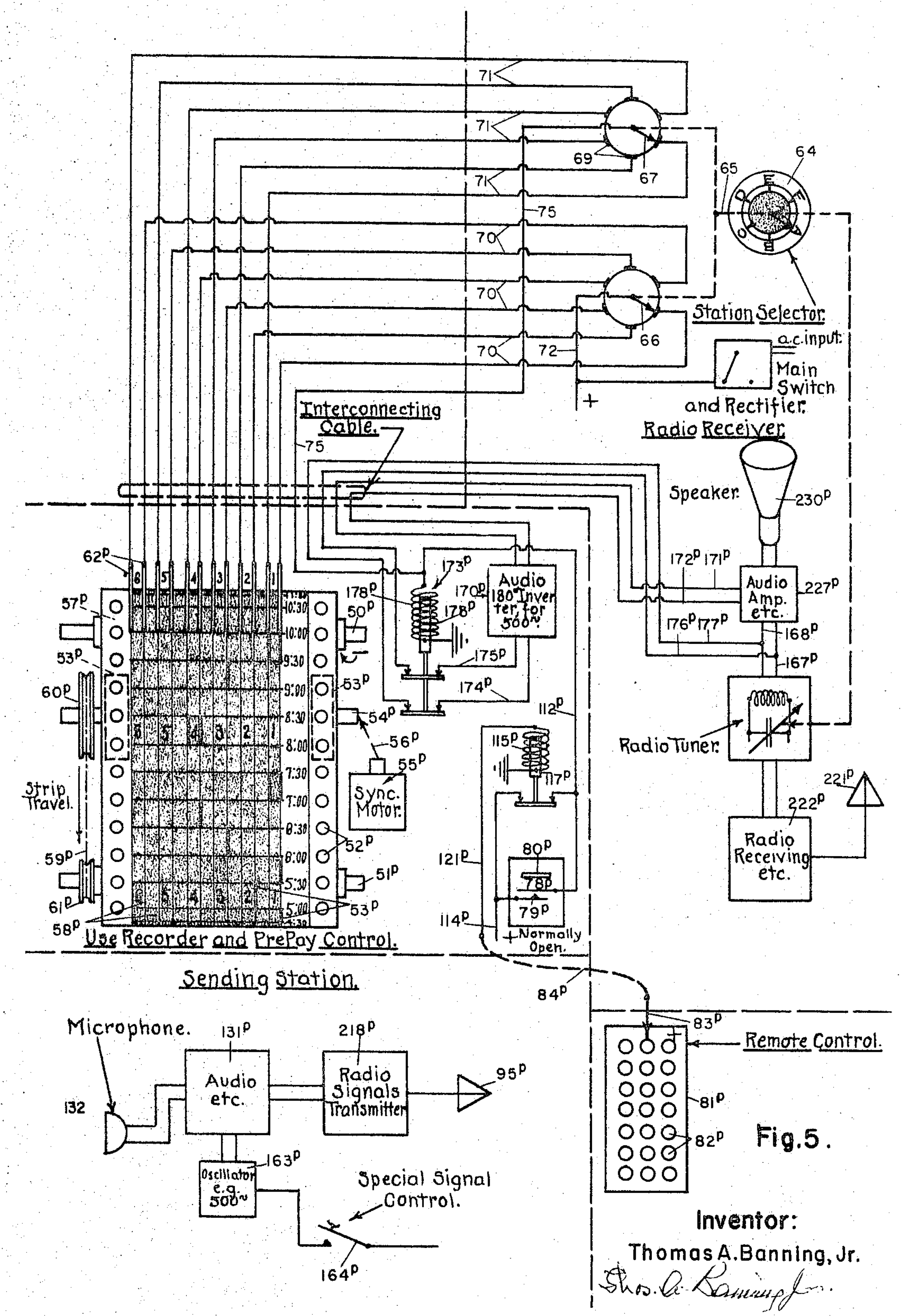

In the drawings:

FIGURE 1 shows an embodiment comprising provision for both television signal reception and translation, and for audio signal reception for the speaker, together with provision for discontinuing the audio translation completely upon reception of a control signal therefor; together with making ineffective such audio discontinuance upon pre-pay or remote control operation, to restore the audio component of reception;

FIGURE 2 shows an embodiment comprising provision for audio reception and translation only, together with provision for discontinuing the audio translation completely upon reception of a control signal therefor; together with means making ineffective such audio discontinuance upon pre-pay or remote control operation, to restore the audio reception and translation;

FIGURE 3 shows an embodiment comprising provision for both color television reception and translation, and for audio signal reception for the speaker, together with provision for introducing an objectional interfering audio translation into the sound translation delivered to the speaker, such interfering audio translation comprising, conveniently, a hum frequency; together with provision of means to blank out such interfering audio translation, comprising means to produce and inject into the audio signals delivered to the speaker, an inverted audio signal opposite to the interfering signal, by use of an inverter; and means under control of a pre-pay or remote control unit, to make such inverted signal effective to blank out or neutralize the interfering signal and deliver to the speaker a true translation of the audio signals without interference;

FIGURE 4 shows an embodiment similar to that shown in FIGURE 3, but in which embodiment the television translation is a monochrome translation; and FIGURE 5 shows an embodiment similar to that shown in FIGURES 3 and 4, but without provision for any television translation, being a simple audio receiver with provision for producing the interfering signal under control of a control signal, together with means to discontinue such interference upon making pre-pay or operating a remote control unit.

Each of the embodiments shown in FIGURES 1, 2, 3, 4 and 5 also includes recording means constituted to produce a time record of the reception tuned and translated from each of a plurality of sending stations, including provision for such a recording whether the tuned reception be for a "special" program or an ordinary program; and the recording in the case of a "special" program will be produced only when the pre-pay or remote control operation has been made effective.

In each of FIGS. 1 and 2 of the embodiments herein disclosed provision is made for reception of a control signal produced concurrently with the program signals to be translated, when the program is a "special" program requiring pre-pay or some form of remote control by which a charge or credit operation is produced against the owner or operator of the receiving equipment. Such control signal may be produced from a convenient location, such as the sending station from which the program is being emitted; and such control signal may be injected into the audio signals emitted from the sending station, or otherwise, either as a radio carried signal or otherwise, provided it is produced and received concurrently with the production and reception of the signals for such "special" program. In each of the embodiments herein to be disclosed I have made provision for injecting such control signal into the stream of signals being emitted by the sending station, but I do not intend to limit myself to such location of production of such control signal, nor to its inclusion as a radio signal in the stream of signals emitted by the sending station, except as I may do so in the claims to follow. No such control signal is needed or shown in the embodiments shown in FIGURES 3, 4 and 5.

Likewise, in each of the showings of FIGURES 1, 3 and 4 the audio signals are produced at the sending station from which the picture signals are emitted, according to conventional practice presently in use; but such audio signals may, if desired, be produced and emitted elsewhere than at such picture signal sending station. Accordingly, I do not intend to limit myself to production of the audio signals at such picture sending station, except as I may do so in the claims to follow.

Referring to FIGURE 1, the embodiment therein shown includes the sending station (so legended), which includes the schematically illustrated picture signal producing equipment, from which the object $88^n$ is scanned according to conventional practise, with both horizontal cross-scans and vertical progress of such scans, producing the picture signals delivered over the lines as shown, to the monochrome signal transmitter $94^n$ and thence to the antenna $95^n$. The audio signals from the microphone $132^n$ are delivered to and mixed with the picture signals also in accordance with conventional practise. From the oscillator $130^n$ control signals of selected frequency (such as 50,000 c.p.s.) above the audible range, may be delivered when the switch is closed, such super-sonic signals then being mixed with the picture signals and emitted therewith, according to conventional practise.

Such control signals are produced concurrently with the sending of the picture signals. At the receiving station both the picture signals and such control signals are received; and the audio signals, including such control signal, are then separated from the picture signals by the conventional "sound trap" $165^n$. Thus both the audio signals and the control signals are delivered from such unit $166^n$. The audio signals are delivered over the lines $167^n$ and $168^n$ to the speaker $230^n$; but such line $167^n$ includes the switch $183^n$ which is under control of the solenoid $184^n$. Thus energization of such solenoid opens the switch and terminates delivery of the audio signals to the speaker as long as such solenoid remains energized.

One terminal of such solenoid is grounded. The other connects by the line $112^n$ to the pre-pay coin or token unit $77^n$, whose contacts $79^n$ and $78^n$ are normally closed. The solenoid $115^n$ has its contacts $119^n$ and $120^n$ included in series with the contacts of the unit $77^n$, so that as long as such solenoid $115^n$ remains un-energized its contact $118^n$ bridges such contacts $119^n$ and $120^n$. The relay $143^n$ has its solenoid $144^n$ normally un-energized so that its contact $148^n$ is normally lowered and does not bridge its contacts $149^n$ and $150^n$. Such contact $149^n$ connects to a source of D.C., and such contact $150^n$ connects by the line $151^n$ to the contact $119^n$ of the relay $115^n$. Therefore the line $112^n$ remains normally un-electrified even though the contacts of the unit $77^n$ and the contacts of the relay $115^n$ are normally bridged. Only when the relay $143^n$ is energized to raise its contact $148^n$ will potential be supplied to the line $112^n$; and when such supply to such line $112^n$ is thus produced, it will be discontinued if the contacts of either the unit $77^n$ or of the relay $115^n$ are opened.

The control signal lines $176^n$ and $177^n$ connect to the terminals of an oscillator $137^n$ which includes the capacitor $147^n$ and the inductance $138^n$. This oscillator is tuned to respond to the frequency of the control signal delivered over the lines $176^n$ and $177^n$, whereupon there will occur a rise of potential on the grid $141^n$ of the tube $140^n$, thus permitting flow of current from the plate $142^n$ of such tube. Such plate connects by the line $146^n$ to one side of the solenoid $144^n$ of the relay $143^n$, thus causing such relay to raise its contacts and bridge the contacts $149^n$ and $150^n$, with simultaneous electrification of the line $151^n$ already referred to. Electrification of the line $151^n$ energizes the solenoid $184^n$, raising the switch $183^n$, and opening the speaker circuit. Such speaker circuit will then remain as long as the control signal is being received and open until either a pre-pay is made to the unit $77^n$ or the relay $115^n$ is energized by remote control. Such remote control is shown schematically as including the plug $83^n$ which may be inserted into one of the sockets $82^n$ of the plate which is electrified.

Such remote control unit may be located at any convenient location, such as the telephone exchange which serves the location where the receiver is located, or such as a central exchange where provision is made for keeping records of the uses of the various receivers under its jurisdiction.

The differential relay $153^n$ having the solenoids $154^n$ and $155^n$ both acting on the common armature $156^n$ is provided. The two solenoids of this relay are so connected and of such magnetomotive force producing characteristics, that when either of them is energized alone the armature will be raised, but when both of them are energized at the same time, their flux producing qualities will neutralize each other, thus terminating the holding power of the solenoid on its armature as long as both solenoids remain energized. Such armature, when in lowered position open circuits the two contacts $157^n$, one of which connects to the current source, and the other of which contacts connects to the line $75^n$. Such line $75^n$ connects to the movable contact $67^n$ of the station selector by which the needle $62^n$ of the recorder traces a discoloration on the sensitive tape of the slowly travelling time recorder. That needle $62^n$ which corresponds to the selected station will thus be electrified, so that the record produced on the tape will identify the particular station whose reception was tuned at the time interval shown on the tape.

The operations of the differential relay are as follows; whenever the control signal is being emitted and response thereto has occurred by the oscillator, the solenoid $154^n$ will be energized due to the rising of the relay $143^n$. Such energization of the relay solenoid $154^n$ would raise the armature $156^n$ and thus electrify the line $75^n$ so that the needle of the recorder, corresponding to the tuned station would thus be electrified. But such electrification of such needle should only occur when proper pre-pay or remote control operation has been made. The solenoid 155ⁿ of such differential relay connects to the line 112ⁿ leading to the solenoid 184ⁿ of the switch 183ⁿ, so that as long as such line 112ⁿ remains electrified, such solenoid 155ⁿ is electrified, thus neutralizing the effect of the solenoid 154ⁿ, and causing the armature of the relay to remain down, or to fall in case it may have risen for an instant. Thus, until either pre-pay has been made into the unit 77ⁿ or remote control operation has been produced, with corresponding de-electrification of the line 112ⁿ, the differential relay will remain down, and the line 75ⁿ will remain un-electrified. The pre-pay or remote control operation will de-electrify the line 112ⁿ, thus de-energizing the solenoid 184ⁿ, and allowing the switch 183ⁿ to close, for restoration of speaker operation, and at the same time the proper needle of the recorder will be electrified, to produce a time record of acceptance of the selected station program as to which the making of pre-pay or remote control operation has been produced.

The foregoing operations respecting the speaker operation do not interfere with continued proper reception of the picture signals, and production of the picture translation. Thus the observer of the television screen will be able to receive a true and fully acceptable picture translation, either with or without the accompanying audio and speaker operation, as desired. Thus, too, since the audio component of the received program is a definite and highly desirable portion of the received program, it is evident that whenever a "special" program is being emitted, the observer of the receiver in question has it within his control to either accept the picture component without the audio component being a "silent picture" reception (non-pre-pay or non-remote control), or to bring the audio component also into translation, thus producing the desired higher quality reception, but with need of paying therefor.

The embodiment shown in FIGURE 2 is the same as that just described, insofar as concerns for the audio translation; but in the present embodiment the provision for the picture signals reception and translation and control, has not been eliminated. The showing of this FIGURE 2 is therefore of an audio reception and translation and control, only. Also, the provisions for emission of a control signal concurrently with the emission of the radio (audio) signals, during the operation of the "special" program, and for reception of such control signal, and for responding to the received control signal, together with the means to discontinue the speaker operation when such control signal is received, and for restoring speaker operation notwithstanding such reception of the control signal, when prepay or remote control operation is produced, are the same as corresponding elements and operations shown in FIGURE 1 and fully described. Accordingly, detailed description of all such elements and operations is unnecessary as respects the showing of FIGURE 2.

In FIGURES 3, 4 and 5 I have disclosed embodiments of audio signals emission and for emission concurrently with such audio signals, an interfering audio frequency signal, such as a uniform frequency signal to produce an unacceptable hum; and for receiving and translating such audio signals and such interfering audio frequency signal, when a "special" audio program is being emitted, requiring pre-pay or remote control operations, so that, without special provision to neutralize or discard such interfering audio signal, a disagreeable and un-acceptable translation of the "special" radio or other program will be produced. FIGURE 3 of such group of figures, shows an embodiment which includes provision for emission of color picture signals, and provisions for reception and translation of such signals as a color picture raster, together with provision for receiving and translating the audio signals comprising a portion of the program, thus producing the conventional color picture and audio program, when the interfering audio frequency signal is not being emitted. This would be the condition existing when an ordinary program was being emitted and received in conventional manner. The embodiment shown in FIGURE 3 also includes provision for receiving the interfering audio frequency signal when such signal is being emitted, during emission of a "special" program, and for including such interfering audio frequency component in the translation sent to and received by the speaker, so that under such conditions of operation an unacceptable translation of the sound component is produced. Provision is then made for neutralizing or blanking out such interfering audio signal, when pre-pay or remote control operation is produced, so that the audio signals delivered to the speaker do not include such interfering audio frequency signal, and a clear, full quality audio reception is produced by the speaker.

FIGURE 4 shows an embodiment the same as that of FIGURE 3, with the exception that the emitted signals are for a monochrome picture program, and the receiver is constituted to produce a corresponding monochrome raster. The audio emission provisions, including the emission of the interfering, audio frequency component, and for receiving and translating such audio frequency signals, including the interfering signal, and provisions for neutralizing or blanking out such interfering signals, by pre-pay or remote control, are the same as described in connection with the showing of FIGURE 3. Detailed description of the showing of FIGURE 4 is thus unnecessary.

The showing of FIGURE 5 is limited to the audio frequency producing and emitting elements, including the production and emission of the interfering audio signal; and such showing is also limited, in the receiver elements, to the audio receiving and translating elements, including the interfering signal, and to the inverter means, and the pre-pay or remote control means for causing the inverter to inject an inverted signal, corresponding to the interfering signal, into the signals prior to sending them to the speaker. Thus when pre-pay or remote control is brought into operation, during reception of a "special" quality program, the reception will be unimpaired by the presence of the emitted interfering signal.

In FIGURE 3, provision is made at the sending station for injection of the audio frequency interfering signals (e.g., 500 c.p.s) into the audio and television signals sent to the antenna 95ᵉ, the switch 164ᵉ being provided for starting and stopping the production of such interfering signals. Thus such signals may be produced only during the emission of the "special" program. At the television receiver all of the signals, including the conventional color picture signals, the program's audio signals, and the interfering signal (when produced) are received by the antenna. The audio signals are transmitted from the sound trap to the unit 165ᵉ. At this point the lines 171ᵉ and 172ᵉ are carried to the two pole relay switch 173ᵉ having the solenoid 178ᵉ. From such switch relay the lines 174ᵉ and 175ᵉ are carried to the inverter unit 170ᵉ. Accordingly, when the switch relay is activated by energization of the solenoid 178ᵉ, to close the switch contacts, the inverter is supplied with current of the interfering frequency. Thereupon such inverter delivers an inverted potential and current over the lines 176ᵉ and 177ᵉ. These connect to the lines 167ᵉ and 168ᵉ leading to the speaker 169ᵉ. Accordingly, the potentials delivered over the lines 167ᵉ and 168ᵉ to the speaker, include the audio component of the program coming from the sending station, plus the interfering frequency signal, plus the inverted version of such interfering frequency signal. By use of an inverter which will deliver inverted voltages opposite in phase (180 degrees) to the interfering signals received over the lines 171ᵉ, 172ᵉ (which so received signals are in phase with the signals delivered towards the speaker, from the unit 166ᵉ), and which voltages delivered by the inverter unit 170ᵉ are of amplitude the same as the signals received by the inverter unit, it is seen that such inverted voltage signals will cancel out the interfering frequency signals coming from the unit $166^e$, leaving, for delivery to the speaker, only the audio frequency signals comprising a portion of the program.

The solenoid $178^e$ of the relay $173^e$ is energized by making pre-pay or remote control operation. To this end the pre-pay coin or token unit $77^e$ has its contacts normally open, and the solenoid $115^e$ of the relay $117^e$ is normally un-energized and in lowered contact position (it is shown in FIGURE 3 as being closed, which would produce closing of the relay $173^e$, as shown). The contacts of such relay $115^e$ and the contacts of the unit $77^e$ are connected in parallel between the source of potential $114^e$ and the line $112^e$ which leads to the solenoid $173^e$, so that the relay $173^e$ will close its contacts either when the unit $77^e$ is actuated by proper coin or token operation, or when the relay $115^e$ is energized by remote control comprising the line $84^e$, and the plug $83^e$, together with the selector board $81^e$.

The embodiment shown in FIGURE 4 is the same as that just described (FIGURE 3), with the exception that the showing of FIGURE 4 is for a monochrome picture production, based on monochrome picture signals emitted from the sending station, whereas the showing of FIGURE 3 was for color picture signals production, and color picture translation. Accordingly, it is deemed unnecessary to describe the embodiment of FIGURE 4 in full detail, since the elements and operations relating to the production and use of the interfering frequency signals during emission of a "special" program, are the same as previously described.

Since the embodiment shown in FIGURE 5 is limited to the elements and operations incident to production and reception, and translation and use of the interfering frequency signals, based on the inverter operation, with emission of "special" audio programs, and since the elements and operations incident to such conditions are the same as like elements and operations already described, it is deemed unnecessary to describe the showings of FIGURE 5 in detail.

The term "super-sonic signal" or like terms, as herein used, means a signal of frequency above that frequency which is audible to human beings; and "sub-sonic signal," or the like, as herein used means a signal of frequency below that frequency which is audible to human beings.

I claim:

1. A television and radio receiver constituted to receive and translate television signals to produce a first intelligible component comprising a picture raster, and to receive and translate signals comprising a second, intelligible component comprising sound effects related to and accompanying said raster during the translation of said signals corresponding to a program; and speaker means constituted to receive the sound effects component to produce the intelligible sound effects concurrently with the production of the raster; together with a remote control station and connections between said remote control station and the intelligible sound component delivering means, said remote control station and connections being constituted to cause the sound component delivering means to deliver the sound component to the speaker concurrently with production of the raster, or to forbid delivery of the sound component to the speaker concurrently with and related to the delivery of the raster, selectively.

2. In a radio transmitting and receiving system for the transmission and interpretation of audio intelligence, the combination of a sending station including means to generate a carrier wave, means to modulate said carrier wave corresponding to the sound intelligence being transmitted; means to emit an interfering signal of audio frequency; together with means to receive and intelligibly translate said audio intelligence carrier wave signal and to produce an audio frequency replica of the audio intelligence corresponding to such carrier wave modulated signal, said receiving and translating means including means to receive and translate the audio frequency interfering signal and to include such audio frequency interfering signal translation in the audio frequency replica of the audio frequency intelligence, means to produce sound intelligence, sound delivery signal connections between the means which receives and produces the audio frequency replica including the audio frequency interfering signal translation, and the sound intelligence producing means, for production of a sound replica of the intelligence, including the interfering signal translation, means to produce an inverted audio frequency signal corresponding to the interfering signal translation, connections between the means which receives and produces the audio frequency replica of the audio intelligence including the interfering signal translation, and the inverter, and connections between the inverter and the sound delivery connections to the sound intelligence producing means, constituted to include the inverted interfering signal translation waves in the sound delivery connections which are between the means which receives and produces the audio frequency replica aforesaid, and the sound intelligence producing means, together with means to make effective or ineffective said connections which are between the inverter and the sound delivery connections.

3. A radio receiver including means to receive a carrier frequency and produce an audio translation thereof; said receiver also including means to receive and translate an interfering signal to produce and deliver an audio interfering signal; a speaker, connections from the audio intelligence translation producing means to the speaker, connections from the audio interfering signal producing means to the speaker; together with means in connection with the audio interfering signal producing means constituted to produce and deliver an inversion of said audio interfering signal, and connections from the inversion producing means to the speaker constituted to deliver to the speaker an inversion of the audio interfering signal; and selector means constituted to make operative or inoperative the inversion producing means and the connections from said inversion producing means to the speaker.

4. In a television system, the combination of a sending station including means to emit video signals and means to emit audio intelligence signals, together with means to produce audio frequency interfering signals, and means to emit the audio frequency interfering signals; and a receiver including means to receive and means to translate said video signals to produce a raster, and including means to receive and means to deliver the audio frequency intelligence signals, and means to receive and means to deliver the audio frequency interfering signals, all said means being constituted to produce an audio signal delivery of the audio intelligence signals and to produce separate audio frequency delivery of the interfering signals; an audio speaker; and connections between the means which produces the audio intelligence signals delivery and the means which produces the separate audio frequency interfering signals delivery, and the speaker; together with an audio frequency interfering signal inverter constituted to receive audio frequency interfering signals and deliver corresponding inverted audio frequency signals; a set of connections between the means which delivers the separate audio frequency interfering signals, and the inverter, constituted to deliver the interfering signals to the inverter; a set of connections between the inverter and the delivery connections which are between the audio frequency intelligence signals delivery means, and the speaker; and switch means included in one of said sets of inverter connections, said switch means having a first defined switch open position, and a second defined switch closed position; together with operator controlled means constituted to move the switch means to the second defined position.

5. In a radio system, the combination of a sending station including means to emit audio intelligence signals, together with means to produce audio frequency interfering signals, and means to emit the audio frequency intelligence signals and means to emit the audio frequency interfering signals; and a receiver including means to receive and means to translate the audio frequency intelligence signals and means to receive and means to translate the audio frequency interfering signals, to produce an audio translation of the audio intelligence signals and an audio translation of the audio frequency interfering signals; and an audio speaker; and signal delivery connections between the means which produces the audio intelligence translations of the audio intelligence signals and the audio interference signals, and the speaker; together with an audio frequency signal inverter, a set of connections between the means which produces the translation of the audio frequency interfering signals, and the inverter constituted to deliver the audio frequency interfering signals to the inverter, another set of connections between the inverter and the audio frequency signal delivery connections which are between the means which produces the audio intelligence translations and the audio interfering translations, to the speaker; and switch means included in one of said sets of connections, said switch means having a first defined switch open position, and a second defined switch closed position; together with operator controlled means constituted to cause the switch means to be in its second defined closed position.

References Cited

UNITED STATES PATENTS

| | | | |
|---|---|---|---|
| 1,941,067 | 12/1933 | Armstrong | 325—64 XR |
| 2,630,525 | 3/1953 | Tomberlin et al. | 325—64 XR |
| 2,671,165 | 3/1954 | Gilpin et al. | 325—64 XR |

JOHN W. CALDWELL, *Acting Primary Examiner.*

DAVID G. REDINBAUGH, *Examiner.*

R. L. RICHARDSON, *Assistant Examiner.*